United States Patent
Park et al.

(10) Patent No.: US 7,062,249 B2
(45) Date of Patent: Jun. 13, 2006

(54) APPARATUS AND METHOD FOR BRANCHING SIGNAL FOR MOBILE TERMINAL

(75) Inventors: Yong-Cheon Park, Gyeonggi-Do (KR); Hyung-Kyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 436 days.

(21) Appl. No.: 10/389,810

(22) Filed: Mar. 18, 2003

(65) Prior Publication Data

US 2003/0181192 A1    Sep. 25, 2003

(30) Foreign Application Priority Data

Mar. 19, 2002  (KR)  .................. 10-2002-0014809

(51) Int. Cl.
*H04B 1/16* (2006.01)
*H04B 1/18* (2006.01)
*H04M 1/00* (2006.01)

(52) U.S. Cl. ............... 455/335; 455/150.1; 455/188.1; 455/552.1; 455/553.1

(58) Field of Classification Search ............ 455/552.1, 455/553.1, 180.1, 188.1
See application file for complete search history.

(56) References Cited

U.S. PATENT DOCUMENTS

| | | | | |
|---|---|---|---|---|
| 5,898,905 | A * | 4/1999 | Aldridge et al. | 455/67.14 |
| 6,249,687 | B1 * | 6/2001 | Thomsen et al. | 455/553.1 |
| 6,298,224 | B1 * | 10/2001 | Peckham et al. | 455/188.1 |
| 6,359,940 | B1 * | 3/2002 | Ciccarelli et al. | 375/316 |
| 6,816,711 | B1 * | 11/2004 | Standke et al. | 455/73 |
| 6,912,406 | B1 * | 6/2005 | Lahlum et al. | 455/553.1 |

FOREIGN PATENT DOCUMENTS

| | | |
|---|---|---|
| CN | 1337840 | 2/2002 |
| JP | 64-071222 | 3/1989 |
| JP | 02-303225 | 12/1990 |
| JP | 09-116458 | 5/1997 |
| JP | 09-284168 | 10/1997 |
| JP | 10-290176 | 10/1998 |
| JP | 11-088031 | 3/1999 |
| JP | 2001-044701 | 2/2001 |
| JP | 2001-160766 | 6/2001 |
| JP | 2001-257621 | 9/2001 |
| JP | 2002-032723 | 1/2002 |
| JP | 2002-043975 | 2/2002 |
| JP | 2002-064576 | 2/2002 |
| JP | 2002-206314 | 2/2002 |
| JP | 2004-522389 | 7/2004 |

* cited by examiner

*Primary Examiner*—Curtis Kuntz
*Assistant Examiner*—Michael T. Thier
(74) *Attorney, Agent, or Firm*—Fleshner & Kim, LLP

(57) ABSTRACT

A system and method for processing signals in a mobile terminal routes received signals to signal processing units based on the bands in which the signals are located. Routing is preferably performed by a m-pole/n-throw electric switch where m≧1 and n≧1. The signal processing units may process signals in, for example, the DCN, PCS and GPS bands although other bands are possible. By using an electric switch instead of, for example, a diplexer circuit, the system and method significantly reduces insertion loss while simultaneously increasing the degree of isolation among the different bands of the received signals. Optimal receiver sensitivity is also achieved in each respective band.

24 Claims, 4 Drawing Sheets

APPARATUS AND METHOD FOR BRANCHING SIGNAL FOR MOBILE TERMINAL

BACKGROUND OF THE INVENTION

1. Field of the Invention

The present invention relates to a receiving apparatus for a mobile terminal, and more particularly to an apparatus and a method for branching signals received by a mobile terminal in different communication bands.

2. Background of the Related Art

FIG. 1 is a block diagram showing a general CDMA mobile terminal, which includes an antenna 10, a radio frequency (RF) unit 20, an intermediate frequency (IF) unit 30, a baseband analog (BBA) unit 40, a baseband modem 50, and an input/output unit 60. The RF unit 20 converts a high frequency signal to an intermediate frequency signal of a modulated carrier, and the IF unit 30 converts the intermediate frequency signal to a baseband frequency signal. The BBA unit 40 converts an analog signal output from the IF unit to a baseband digital signal. The baseband modem 50 controls an input/output signal of a display panel included in input/output unit 60 and of a keypad. The baseband modem further controls voice input/output on a microphone and an earphone.

FIG. 2 is a block diagram showing the structure of RF unit 20 of the CDMA mobile terminal. As shown, when an RF signal is received from an outer part, a received frequency signal is separated from the RF signal input from antenna 10 by a duplexer 21. The received frequency signal is then amplified by a low noise amplifier (LNA) 26 and converted into an intermediate frequency signal by a down-conversion mixer (DMIX) 28 after passing through a band pass filter 27. The converted intermediate signal is amplified in an IF amplifier 29 and sent to the IF unit 30.

In a transmission process, an intermediate frequency signal output from the IF unit 30 is converted into an RF signal by an up-conversion mixer (UMIX) 25. This signal is then amplified by a driver amplifier 23 after passing through a band pass filter 24, and the power of the signal output from the driver amplifier is amplified by a power amplifier 22. The resulting signal is sent to a base station through the antenna.

CDMA mobile terminals of the aforementioned type have been adapted to perform a function of satellite-based global positioning system (GPS). Terminals of this type support one or more bands including an 800 MHz DCN band, a Korea-type 1.8 GHz PCS band, a U.S. type 1.9 GHz PCS band, and 1.5 GHz GPS band. That is, the CDMA mobile terminal which performs the GPS function is divided into a dual-band terminal which operates in DCN and GPS bands or PCS and GPS bands and a tri-band terminal which operates in DCN, PCS and GPS bands.

FIG. 3 shows a conventional receiving apparatus of a mobile terminal using a single antenna supporting the tri-band, and FIG. 4 shows a conventional receiving apparatus of a mobile terminal using a dual-band antenna and a single band antenna. As shown therein, since the mobile terminal is operated in one or more bands, a circuit for branching an RF signal by respective bands is required in the antenna supporting the multi-bands. For example, in case of a U.S. type tri-band terminal having the most complex configuration, one antenna 70 supporting the tri-band of DCN, PCS and GPS may be used, or a dual band antenna supporting the DCN and PCS and single band antenna 90 supporting only the GPS may be used respectively.

The single antenna supporting the tri-band of DCN, PCS and GPS as shown in FIG. 3 will now be described in greater detail. An RF signal received by the tri-band antenna 70 is branched to a duplexer of DCN band 75 and to another diplexer of GPS and PCS band 72 by a diplexer 71. After that, the diplexer 72 transmits the input signal to an RF band pass filter 73 of GPS band when the input signal is in 1.5 GHz band, and transmits the input signal to a PCS duplexer 74 of PCS band when the input signal is in 1.9 GHz band. That is, diplexers 71 and 72 are a kind of manual filter made by integrating two band pass filters. Functionally, diplexer 71 outputs an input signal from antenna 70 to an input stage of a DCN transceiver if the input signal is in the 800 MHz band, and outputs through diplexer 72 the input signal to an input stage of a GPS or PCS transceiver if the input signal is in the 1.5 to 1.8 GHz band.

The dual-band antenna supporting the DCN and PCS bands and the single-band antenna 90 supporting the GPS band shown in FIG. 4 will now be described in greater detail. The RF signal received by the dual band antenna 80 is branched to a PCS diplexer 83 when it is in the PCS band, and to a DCN duplexer 82 when it is in the DCN band after passing diplexer 81. In addition, the GPS signal is received by additional antenna 90 of the GPS band and input into an RF band pass filter 91.

Diplexers 71, 72 and 81 for branching the signal in the mobile terminal are undesirable because they have an insertion loss (e.g., a loss when the signal is passed) of 0.5~0.8 dB, and have an isolation corresponding to the isolated degree between bands of 15~20 dB. The insertion loss is generated as a result of signals passing through two or more diplexers in order to branch the multi-band signal, and therefore receiver sensitivity is lowered. For example, insertion loss can be increased to 1~1.5 dB in case that the two diplexers 71 and 72 in FIG. 3 are used. Also, in case of the GPS having isolation between bands as an important factor, isolation of about 15~20 dB can be too weak to block the interrupt between the different bands.

SUMMARY OF THE INVENTION

An object of the invention is to solve at least the above problems and/or disadvantages and to provide at least the advantages described hereinafter.

Another object of the present invention is to provide an apparatus and a method for branching a signal in a mobile terminal by blocking interrupts between different bands using an electric switch between input stages of an antenna and a transceiver.

To achieve these and other objects and advantages, the present invention provides an apparatus for branching a signal in a mobile terminal comprising an electric switch for branching an RF signal input from an antenna by respective bands using electric switching method and outputting the divided signal into an input stage of a transceiver, and a CPU applying a band selecting signal for controlling the electric switch.

The present invention also provides a method for branching a signal in a mobile terminal by electrically switching an RF signal input by a band-selecting signal of a CPU, branching the signal to a port corresponding a respective band, and outputting the signal to an input stage of a transceiver.

DETAILED DESCRIPTION OF PREFERRED EMBODIMENTS

Figure 1:
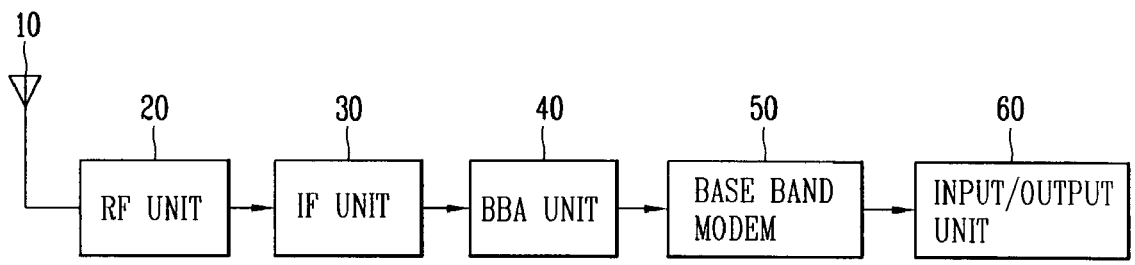
FIG. 1 is a block diagram showing a CDMA mobile terminal.
Figure 2:
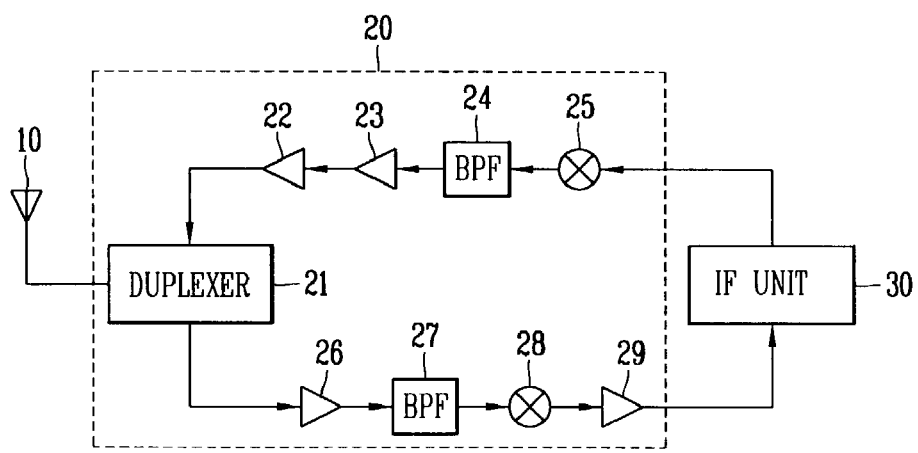
FIG. 2 is a block diagram showing an RF part of the CDMA mobile terminal of FIG. 1.
Figure 3:
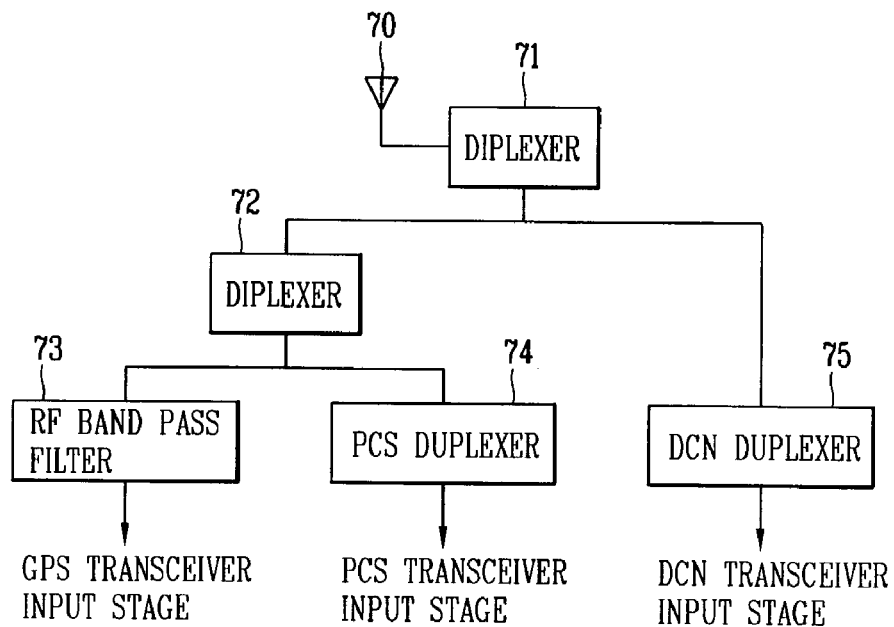
FIG. 3 is an exemplary view showing a receiving apparatus of a general mobile terminal using a single antenna supporting tri-band.
Figure 4:
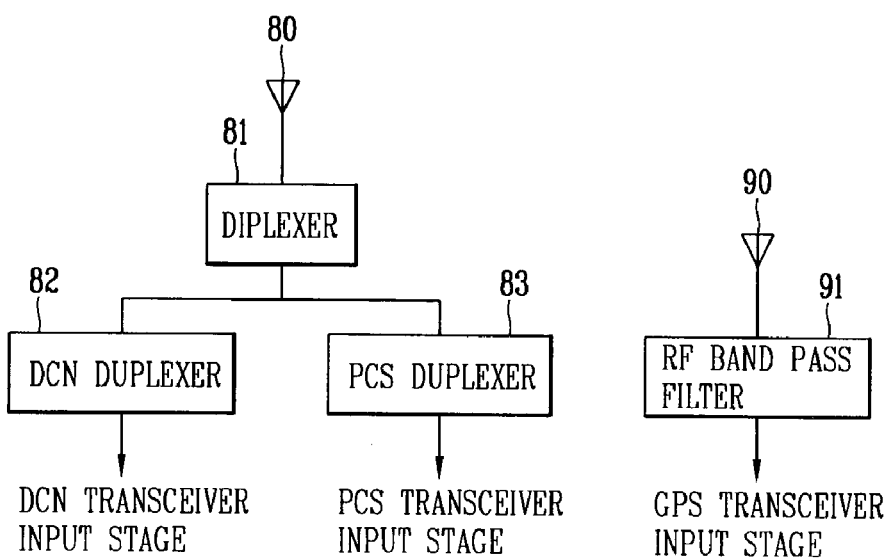
FIG. 4 is an exemplary view showing a receiving apparatus of a general mobile terminal using a dual band antenna and a single band antenna.
Figure 5:
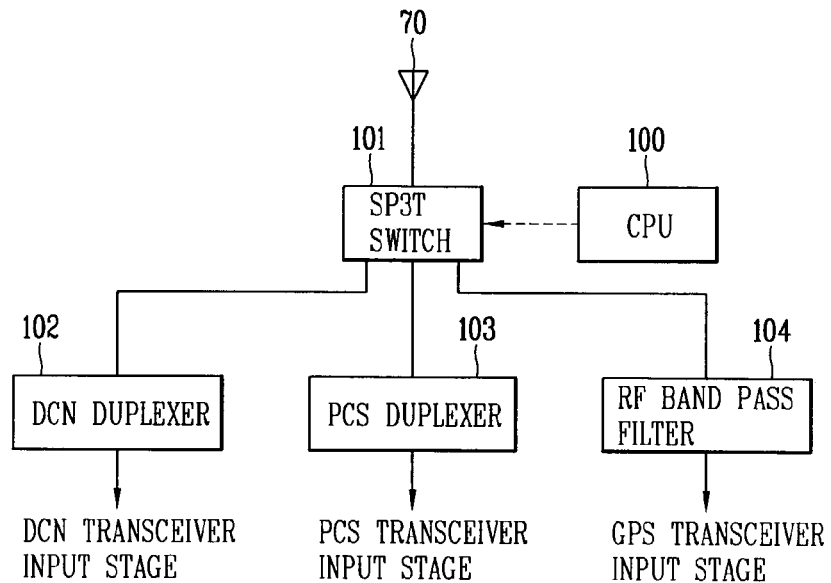
FIG. 5 is a brief view showing a configuration of a signal branching apparatus for a mobile terminal according to the present invention.

FIG. 5 is a diagram showing a signal-branching apparatus for a mobile terminal according to one embodiment of the present invention. This apparatus includes multi-band antenna 70 receiving radio frequency (RF) signals of DCN, PCS and GPS bands, and a single-pole triple throw (SP3T) switch 101 for branching the signal received through the multi-band antenna by bands using an electric switching method after receiving the RF signal. A DCN duplexer 102 receives a DCN band signal input through the SP3T switch 101 and separates a received frequency signal, a PCS duplexer 103 receives a PCS band signal input through the SP3T switch 101 and separates a received frequency signal, and an RF band pass filter 104 receives an RF signal of GPS band through the SP3T switch 101 and separates the received frequency signal. Also included is a CPU 100 which applies a band-selecting signal for branching the signal received through antenna 70 by bands to the SP3T switch 101. The aforementioned electric switching method may be a software procedure set by the CPU.

Operation of the signal-branching apparatus of the present invention will now be described. First, the SP3T switch 101 receives RF signals of DCN, PCS and GPS bands through the multi-band antenna 70, and divides the signal by bands by electrically switching the signal according to a band-selecting signal of the CPU 100. At that time, the CPU applies the band-selecting signal to the SP3T switch through a general purpose input/output (GPIO) port in order to process DCN, PCS and GPS modes which are presently under processing.

If the present mode is DCN mode, the DCN duplexer 102 receives a DCN signal through the SP3T switch, separates a received frequency signal, and applies the signal to an inner signal processing unit. If the present mode is PCS mode, PCS duplexer 103 receives the PCS signal through the SP3T switch, separates the received frequency signal, and applies the signal to an inner signal processing unit. If the present mode is GPS mode, RF band pass filter 104 receives the RF signal of GPS band through the SP3T switch, separates the received frequency signal, and applies the signal to an inner signal processing unit. That is, the SP3T switch receives one input signal, and branches it to one of three output ports according to the band-selecting signal of the CPU. If desired, the same inner signal processing unit may be used to process signals output from two or more of the duplexers 102 and 103 and band pass filter 104. Those skilled in the art can appreciate that the present invention may be adapted to include more or less than three output ports (i.e., receive and route signals in more or less than three communication bands) if desired.

Figure 6:
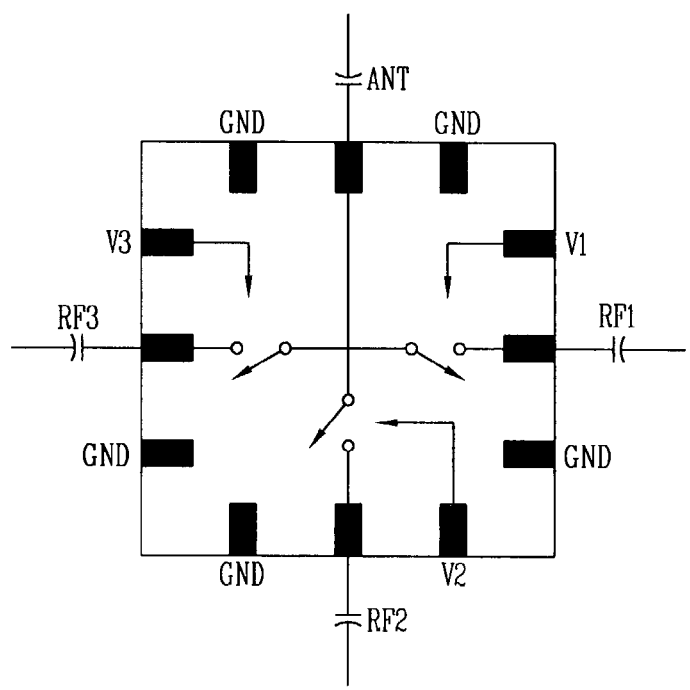
FIG. 6 is a view showing a configuration of a single-pole triple throw (SP3T) switch of a mobile terminal according to the present invention.

FIG. 6 shows an exemplary structure of the SP3T switch according to the present invention. As shown, the SP3T switch branches the signal to one of the three output terminals when an input signal is received through the antenna. At that time, the switch is controlled in such way that one of the three output paths is decided after receiving a digital low/high control signal from the CPU.

The electric switch such as the SP3T switch has a low insertion loss (e.g., about 0.3 dB), and has higher isolation between bands compared with the conventional arrangements previously described. As a result, the transmit/receive function of the transceiver/receiver of the present invention in each respective band is substantially improved. The isolation of the electric switch is superior because although the resistance value is very low between the input/output terminals which are electrically connected, other output terminals are placed in a short-circuited status. That is, there is insertion loss when the input signal passes through the switch, and the switch has a higher isolation for the other output terminals, and therefore, the switch can be used for branching the RF signal instead of using the diplexer used in conventional circuits.

Figure 7:
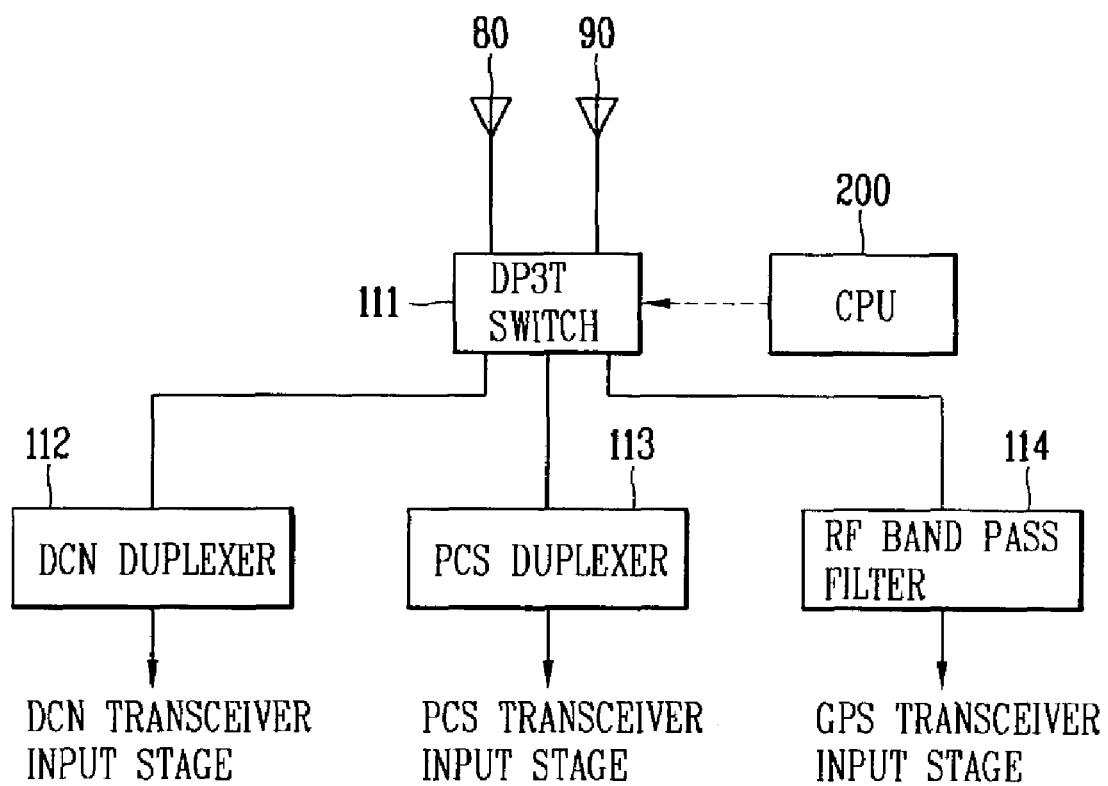
FIG. 7 is a brief view showing another embodiment of a signal branching apparatus for the mobile terminal according to the present invention.

FIG. 7 is a diagram showing a signal-branching apparatus according to another embodiment of the present invention. This apparatus includes a dual-band antenna 80 which receives signals in PCS and DNS bands and a GPS antenna 90 which receives signals in a GPS band. Also included is a DP3T switch 111 for branching signals received through the dual band antenna and the GPS antenna, by modes using an electric switching method, after receiving the RF signals. A DCN duplexer 112 receives the DCN-band signal input through the DP3T switch and divides received frequency signal, a PCS duplexer 113 receives the PCS-band signal input through the DP3T switch and separates the received frequency signal, and an RF band pass filter 114 receives the RF signal through the DP3T switch and separates the received frequency signal. A CPU 200 applies a band-selecting signal to the DP3T switch for branching the signals received through the dual-band antenna 80 and the GPS antenna 90 by respective modes. While antenna 80 has been described as a dual-band antenna, those skilled in the art can appreciate that is antenna may receive more than two bands if desired.

Operation of the signal-branching apparatus according to the foregoing embodiment of the present invention will now be described. First, the DP3T switch receives RF signals through the dual-band antenna 80 and the GPS antenna 90 and branches the signals by modes by electrically switching the signals. The terminal CPU applies the band-selecting signal (branch control signal) to the DP3T switch 17 through a general purpose input/output (GPIO) port in order to process the DCN, PCS and GPS modes which are presently under processing.

If the present mode is DCN mode, the DCN duplexer 112 receives the DCN band signal input through the DP3T switch, separates the received frequency signal, and applies the signal to an inner signal processing unit. If the present mode is PCS mode, the PCS duplexer 113 receives the PCS signal through the DP3T switch, separates the received frequency signal, and applies the signal to the inner signal processing unit. If the present mode is GPS mode, the RF band pass filter 114 receives the RF signal of the GPS band through the DP3T switch, separates the received frequency signal, and applies the signal to the inner signal processing unit. Therefore, the DP3T switch receives two input signals and may branch one of the two to one of the three output terminals according to the band-selecting signal of the CPU.

In addition to the SP3T and the DP3T switches described above, the electric switch of the present invention may be configured to receive a plurality of input signals and to branch the signals to one of a plurality of output ports according to the band-selecting signal of the CPU. That is, the electric switch can be configured as a single-pole double throw (SPDT), a single-pole quadruple throw (SP4T), a double-pole double throw (DPDT), a double-pole quadruple throw (DP4T) or a switch circuit using a PIN diode. Also, the electric switch may be fabricated using, for example, a GaAs FET or a diode according to semiconductor fabrication process or using silicon device such as BiCMOS, CMOS, SiGe HBT and Bipolar.

The mobile terminal of the present invention uses the electric switch in order to branch the RF signal received through the antenna to the duplexers of respective bands, instead of using the diplexer. Accordingly, the mobile terminal according to the present invention has an effect that an optimal receiver sensitivity can be maintained at respective bands since signals of other bands do not interrupt, by reducing the insertion loss and increasing the isolation between bands using the electric switch.

The CPU of the present invention may generate a band-selecting signal in at least the following ways. A multi-mode terminal supporting various modes (DCN, PCS, etc.) may include PRL (Preferred Roaming List) software. The PRL includes the modes supported by the terminal and channel information of the various modes used by the provider, and these may be scanned sequentially. It may be the case that a large geographical region such as the U.S.A. may not be covered by one mode. Consequently, one region may be supported by DCN and another region by PCS.

When the multi-modal terminal supporting DCN and PCS is turned on in a certain region, the CPU of the terminal may perform a sequential scan based on information included in the PRL. For example, a phase-locked loop (PLL) frequency synthesizer may set a frequency corresponding to the PCS-band channel and demodulate signals accordingly. If a normal CDMA signal is not demodulated, it may be concluded that there is no PCS signal. Then, the frequency synthesizer may set and demodulate signals based on the DCN-band channel. During these operations, the CPU may output a control signal corresponding to the present mode, and the path of SP3T of a similar switch may be set as corresponding to the output (a kind of feedback control).

In the case of GPS, a slightly different approach may be taken. Up to this point, the terminal may not find a GPS signal at any time. It may, however, receive the signal through the GPS path only in the following two cases. In the first case, GPS information is required from the base station to the terminal during the telephone call. In the second case, the user requires the GPS information (for example, when the user dials 911 in the U.S.A.). In this case, the telephone call is connected with the base station first, and the base station requires the GPS information to the terminal.

Consequently, the CPU changes the mode according to its own information, or according to the request of the base station. And, since the CPU recognizes the present mode and the mode which will be changed, the CPU outputs the band-selecting signal corresponding to the modes and the switches such as the SP3T receive the signal to set the path.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for processing signals in a mobile terminal, comprising:
   receiving an RF signal; and
   controlling a switch, based on a band-selecting signal from a controller, to route the RF signal to one of a plurality of signal processing stages, each of said signal processing stages processing signals in a respective one of a plurality of frequency bands, the routing further comprising:
   routing the RF signal to a DCN duplexer if the RF signal is in a frequency band which includes DCN signals and then to one of said signal processing stages processing signals in a DCN frequency band;
   routing the RF signal to a GPS band pass filter if the RE signal is in a frequency band which includes GPS signals and then to one of said signal processing stages processing signals in a GPS frequency band; and
   routing the RE signal to a PCS duplexer if the RF signal is in a frequency band which includes PCS signals and then to one of said signal processing stages processing signals in a PCS frequency band, and
   wherein the switch provides isolation between bands producing optimal receiver sensitivity to be maintained at respective bands since other bands do not interrupt.

2. The method of claim 1, wherein if the RF signal includes a DCN signal, the DCN duplexer receives the DCN signal input through the switch, separates the received DCN signal, and applies the separated signal to a corresponding one of said signal processing stages.

3. The method of claim 1, wherein if the RF signal includes a PCS signal, the PCS duplexer receives a PCS signal through the switch, separates the received PCS signal, and applies the separated signal to a corresponding one of said signal processing stages.

4. The method of claim 1, wherein if the RF signal includes a GPS signal, an RF band pass filter receives the GPS signal through the switch, separates the received frequency signal, and applies the signal to a corresponding one of said plurality of signal processing stages.

5. The method of claim 1, wherein the RF signal includes a multi-band signal.

6. The method of claim 5, wherein the switch receives the multi-band signal as derived from one signal and routes the multi-band signal to one of three output ports based on the band-selecting signal output from the controller.

7. The method of claim 5, wherein the switch receives the multi-band signal as derived from two signals and routes the two signals to respective output ports based on band-selecting signals output from a controller.

8. A signal-branching apparatus of a mobile terminal, comprising:
   an electric switch which routes a plurality of input signals received from an antenna to one of a plurality of signal processing stages, each of said signal processing stages processing signals in a respective one of a plurality of frequency bands including a DCN band, a PCS band and a GPS band;

a controller which applies a band-selecting signal to the switch for controlling routing of the signals to corresponding said signal processing stages;

a DCN duplexer which receives a DCN frequency signal in the plurality of signals through the electric switch, separates the received DCN frequency signal, and applies the separated DCN signal to a corresponding one of said plurality of signal processing stages;

a PCS duplexer which receives a PCS frequency signal through the electric switch, separates the received PCS frequency signal, and applies the separated PCS signal to a corresponding one of said plurality of signal processing stages; and an RF band pass filter which receives a GPS frequency signal through the electric switch, separates the received GPS frequency signal, and applies the separated GPS signal to a corresponding one of said plurality of signal processing stages, wherein the switch provides isolation between bands producing optimal receiver sensitivity to be maintained at respective bands since other bands do not interrupt.

9. The apparatus of claim 8, wherein the electric switch is includes one of a GaAs FET, a diode, and a silicon device made of BiCMOS, CMOS, SiGe HBT and Bipolar.

10. The apparatus of claim 8, wherein the electric switch is one of a single-pole double throw (SPDT) switch, a single-pole quadruple throw (SP4T) switch, a double-pole double throw (SPDT) switch, a double-pole triple throw (DP3T) switch, a double-pole quadruple throw (DP4T) switch, and a switch including a PIN diode.

11. The apparatus of claim 8, wherein the RF signal received as one input signal and the electric switch routes the RF signal to one of three output terminals according to the band-selecting signal of the controller.

12. The apparatus of claim 11, wherein the controller outputs the band-selecting signal to the electric switch through a general purpose input/output (GPIO) port.

13. The apparatus of claim 8, wherein the RF signal is derived from two received input signals and the electric switch routes the two input signals to corresponding ones of three output terminals according to band-selecting signals from the controller.

14. The apparatus of claim 13, wherein the controller outputs the band-selecting signal to the electric switch through the GPIO port.

15. The apparatus of claim 8, further comprising:

an antenna for inputting the RF signal to the electric switch, said antenna including a multi-band antenna receiving signals included in PCS, DCN and GPS bands.

16. The apparatus of claim 8, wherein the antenna comprises a dual-band antenna receiving signals of PCS and DCN bands and a GPS antenna receiving a signal of GPS band.

17. The apparatus of claim 8, wherein the mobile terminal is a dual-band terminal having one of DCN and GPS functions or PCS and GPS functions.

18. The apparatus of claim 8, wherein the mobile terminal is a multi-band terminal which receives signals in DCN, PCS and GPS bands.

19. The apparatus of claim 8, wherein the mobile terminal is a multi-band terminal Which performs a GPS function.

20. A signal-dividing apparatus for a mobile terminal, comprising:

an electric switch which routes RF signals received through an antenna to at least one of a plurality of signal processors, each of said signal processors processing signals in a respective one of a plurality of frequency bands;

a controller which applies band-selecting signals to the electric switch for controlling the routing of RF signals by the electric switch;

a DCN duplexer which separates a first one of said RF signals in a DCN band into a first received frequency signal;

a PCS duplexer which separates a second one of said RF signals in a PCS band into a second received frequency signal; and an RF band pass filter which receives a third one of said RF signals in a GPS band into a third received frequency signal, wherein the switch provides isolation between bands producing optimal receiver sensitivity to be maintained at respective bands since other bands do not interrupt.

21. The apparatus of claim 20, wherein the electric switch routes said RF signals to corresponding output ports based on the band-selecting signals of the controller.

22. The apparatus of claim 21, wherein the controller outputs the band-selecting signals to the electric switch through a GPIO port.

23. The apparatus of claim 20, wherein the electric switch outputs the RF signals to the DCN duplexer when the signal is in a band which includes 800 MHz, outputs the RF signals to the GPS band pass filter when the signal is in a band which includes 1.5 GHz, and outputs the RF signal to the PCS duplexer when the signal is in a band which includes 1.9 GHz.

24. The apparatus of claim 20, wherein the electric switch is one of a single-pole double throw (SPDT) switch, a single-pole quadruple throw (SP4T) switch, a double-pole double throw (DPDT) switch, a double-pole triple throw (DP3T) switch, a double-pole quadruple throw (DP4T) switch, and a switch including PIN diode.

* * * * *